Feb. 24, 1970  J. CULLIS, JR  3,497,751
TRANSPARENT ELECTRODE AND DEVICE USING THE SAME
Filed Sept. 25, 1967  2 Sheets-Sheet 1

INVENTOR.
JOHN CULLIS, JR.
BY Robert C. Green
ATTORNEY

Feb. 24, 1970   J. CULLIS, JR   3,497,751
TRANSPARENT ELECTRODE AND DEVICE USING THE SAME
Filed Sept. 25, 1967   2 Sheets-Sheet 2

INVENTOR.
JOHN CULLIS, JR.

BY
*Robert C. Green*
ATTORNEY

United States Patent Office 3,497,751
Patented Feb. 24, 1970

3,497,751
TRANSPARENT ELECTRODE AND DEVICE USING THE SAME
John Cullis, Jr., Basking Ridge, N.J., assignor to Burroughs Corporation, Detroit, Mich., a corporation of Michigan
Filed Sept. 25, 1967, Ser. No. 671,539
Int. Cl. H01j 7/42; H01k 1/60
U.S. Cl. 313—109.5         12 Claims

ABSTRACT OF THE DISCLOSURE

The disclosure is of a transparent electrode for a display device, and a display device which uses a transparent metal electrode which normally appears to be opaque but which is made to function as though it were transparent by the provision of large numbers of tiny holes therein.

BACKGROUND OF THE INVENTION

One large group of display devices uses an ionizable gas such as neon, argon, or the like which can glow when proper electrical potentials are applied. Devices which use an ionizable gas have many different configurations. For example, some operate merely by causing the entire volume of gas to glow, and others use electrodes in conjunction with the gas to display numerals, letters, characters, or messages. Devices of the latter type have wide utility and are found in many forms. However, in general, the primary limitation in the construction of display devices derives from the fact that electrodes are usually of metal and are opaque, and of course, one cannot see through them. Transparent electrodes made of gold and tin chloride are known; however, these materials are not completely satisfactory for electrodes in display devices because of the relative complexity and expense of the process by which they are deposited. In addition, gold does not have optimum adherence to glass, which is the material ordinarily used as a support for the transparent electrode. In addition, these transparent electrodes are necessarily very thin and, as a result, they may not have sufficient conductivity.

SUMMARY OF THE INVENTION

Briefly, the present invention comprises a display device which utilizes one or more transparent electrodes which are made of a metal which appears opaque but which is treated so that it functions as though it were transparent. The invention also relates to a method of making such an electrode.

DESCRIPTION OF THE PREFERRED EMBODIMENTS

Figure 1:
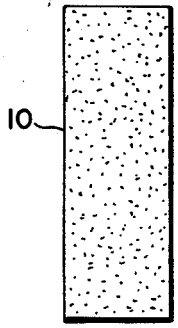
FIG. 1 is a plan view of a device embodying the invention.

As will be clear from a reading of the following description of the invention, it is impossible to illustrate the apparatus of the invention as it appears to a user of the invention. The principles of the invention utilize an electrode structure which includes a large number of tiny holes so that, when the electrode is viewed at arm's length, it appears to be opaque and the holes cannot be seen. However, if a source of light is placed behind the electrode, then light passing through the many tiny holes imparts an illusion of transparency to the electrode. Thus, in the drawing, either no holes are shown in places or large holes are shown. FIG. 1 approximates the appearance of an electrode embodying the invention when viewed up close; however, the viewer would see a myriad of tiny black spots more or less uniformly arranged.

Figure 2:
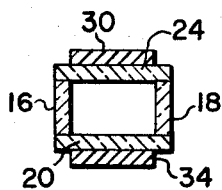
FIG. 2 is a sectional view of the device of FIG. 1.

The principles of the invention may be used in many different types and configurations of devices. One simple structure shown in FIGS. 1 and 2 comprises a cell 10 made of glass and filled with an ionizable gas such as neon or the like. The cell may be elongated, as shown in FIG. 1, to represent the numeral "1" or the letter "I," for example, or it may be shaped to represent any other numeral or character or a message. The cell 10 (FIG. 2) may be constructed so that it has side walls 16 and 18, a bottom wall 20 and a top wall 24. Since the top wall 24 would normally be the wall through which the glowing gas is viewed and which, in effect, provides the desired character representation, it is preferable that this wall be flat.

Figure 3:
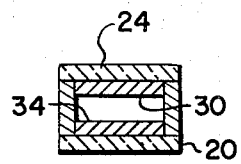
FIG. 3 is a sectional view of a device which is a modification of the device of FIG. 1.

Electrodes are provided for applying energizing potentials to the gas in the cell and causing it to glow, with one electrode 30 being provided on the top wall 24 and the other electrode 34 being provided on the bottom wall 20. These electrodes may be formed outside the cell as in FIG. 2 or inside the cell as in FIG. 3. If the devices are to be operated so that the glowing gas is viewed through the top wall and not through the bottom wall, then the bottom electrode 34 may be a solid, opaque electrode and may be of copper, nickel, chromium, or the like. However, the upper electrode 30 embodies the invention and comprises a film electrode formed on the upper wall and treated so that it appears to be transparent.

According to the invention, the film electrode 30 is made so that it has a very large number of tiny holes of any suitable shape which are of sufficient number that, when the gas in the cells glows, the electrode appears to be transparent and the entire surface of gas beneath the electrode is visible. Thus, an open area of about 60% or a hole density of about 250 holes per linear inch is suitable. The transparent electrode of the invention may be made of metals such as nickel, copper, or the like, with chromium being especially suitable for the intended purpose because it adheres well to glass.

One method of making a transparent electrode according to the invention includes the following steps: (1) evaporating a film of chromium onto the glass plate which comprises the top wall 24 of cell 30; the chromium film may have a thickness of the order of 5000 angstroms; (2) coating the film of chromium with a layer of photosensitive material; (3) exposing this layer of photosensitive material through a fine mesh screen having a pattern such that the unexposed region comprises a large number of tiny, spaced-apart areas in the shape of circles, squares, or the like; (4) developing the exposed pattern to harden the exposed areas and render them resistant to etching; (5) etching to remove all unexposed portions of the chromium film and to remove the photosensitive material.

Figure 4:
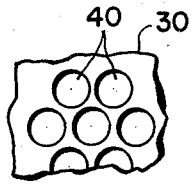
FIG. 4 is a plan view considerably enlarged of an electrode embodying the invention.

After these steps have been completed, the glass plate (FIG. 4) carries a chromium film electrode 30 which appears visually to be continuous and is electrically continuous but includes a large number of holes 40 which effectively render it transparent.

Figure 5:
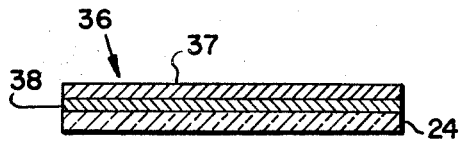
FIG. 5 is a sectional elevational view of apparatus used in practicing the invention.

This electrode 30 may be formed on the wall 24 after the cell has been assembled by well known techniques, or it may be formed on the top wall before the wall is bonded to the side walls of the cell. Electrode 30 might also be formed from a starting component 36 which includes a thin layer of copper 37 or other metal on a transparent film 38 of synthetic organic material such as Mylar (FIG. 5). Holes are formed in the metal layer 37 as described above, and then the component 36 is secured to a glass plate, such as wall 24, by means of any suitable adhesive.

Figure 6:
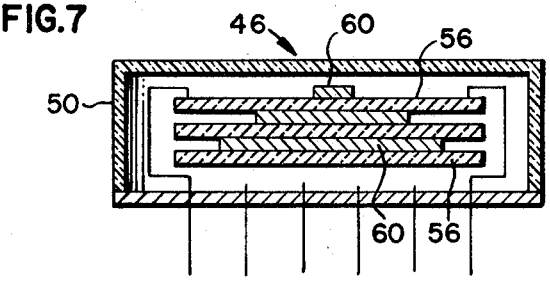
FIG. 6 is a sectional elevational view of another type of device which may utilize the invention.

Another type of device which can utilize the principles of the invention is shown in U.S. Patent 2,142,106 and is illustrated in part in FIG. 6. This device 46 is known as a cold cathode indicator tube and comprises a gas-filled envelope 50 which contains a plurality of sheets of glass 56, to each of which is cemented a cathode electrode 60. Each cathode comprises a strip of metal formed in the shape of a numeral. Ordinarily, ten glass sheets 56 and ten cathode numerals 60 are used. In this tube 46, according to the invention, the cathode numerals 60 on each plate are apertured film electrodes of the type embodying the invention. It can be seen that each electrode in the stack can glow and be seen without being obscured by the ones above it.

Figure 7:
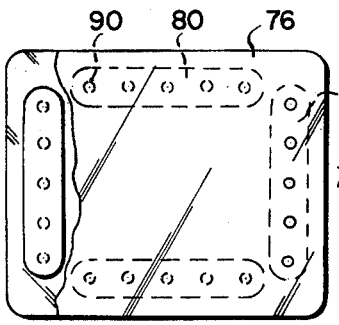
FIG. 7 is a plan view of a portion of still another type of device which may utilize the invention.
Figure 8:
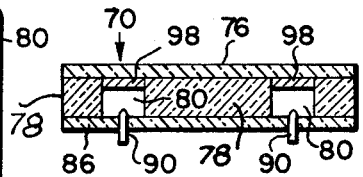
FIG. 8 is a sectional view of the device shown in FIG. 7.

Another type of device which can use the principles of the invention is shown in U.S. Patent 3,260,880 and is shown in part in FIGS. 7 and 8. This device or tube 70 comprises a sandwich of plates including a top or cover plate 76, an intermediate plate 78 having a plurality of channels or cells 80, and a base plate 86. This is known as a segment-type device since each channel or cell comprises a segment which is combined with other channels or segments to represent characters. Each channel is filled with an ionizable gas and includes a plurality of anode rods 90 which are secured to the base 86. Each channel also includes a cathode electrode in operative relation with the gas and with the anode electrodes in the channel. In this device 70, according to the invention, the cathode electrodes 98 are provided on the lower surface of cover plate 76, with each cathode being associated with one of the channels and having the same area and shape as its channel.

Figure 9:
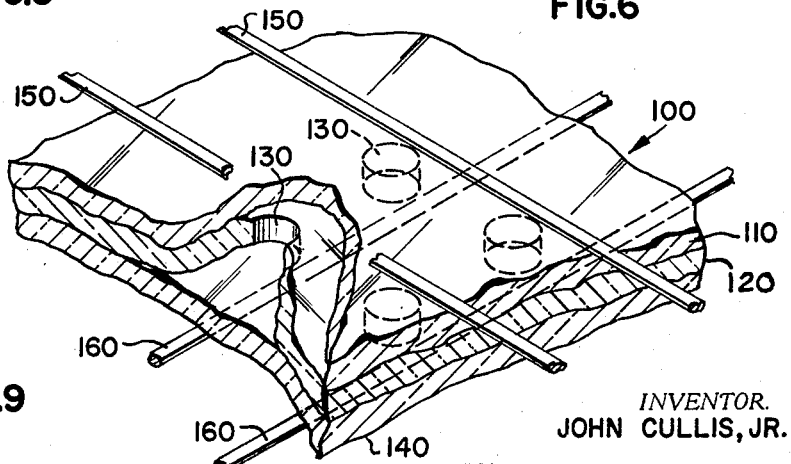
FIG. 9 is a perspective view, partly in section, of still another device which may utilize the invention.

Another display device 100 which can utilize the invention is a matrix device (FIG. 9) which comprises a sandwich of glass plates including a top plate 110, an intermediate plate 120 having a plurality of small holes or cells 130 arranged in rows and columns, and a bottom plate 140. In this device, an electrode strip 150 is formed on the top surface of the top plate overlying each row of apertures in the center plate, and similar strips of electrodes 160 are formed on the bottom surface of the bottom plate under each column of apertures or cells in the center plate. The gas in each cell can be caused to glow by means of potentials applied to the electrodes which lie above and below it, and a character can be displayed by causing groups of cells to glow. In this embodiment of the invention, only one set of electrodes 150 need be apertured in accordance with the invention, and the other set may be opaque.

Figure 10:
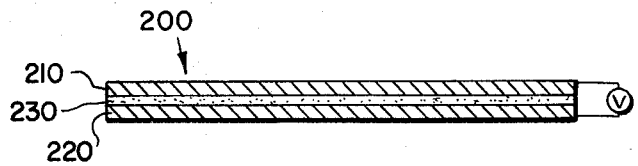
FIG. 10 is a sectional elevational view of another device which may utilize the invention.

The principles of the invention can also be utilized in electroluminescent devices of the panel type which generate an area of light, or of the segmented type which display characters. An electroluminescent device, referring to FIG. 10, includes essentially a pair of conductive films or plates 210 and 220, between which is disposed a layer 230 of a phosphor which can be excited to generate light by the application of a suitable potential applied across it by way of the conductive films. In such a device, the top film 210 is the viewing window of the device and is an apertured electrode of the type described above. The same principles are applicable to segmented electroluminescent devices.

Figure 11:
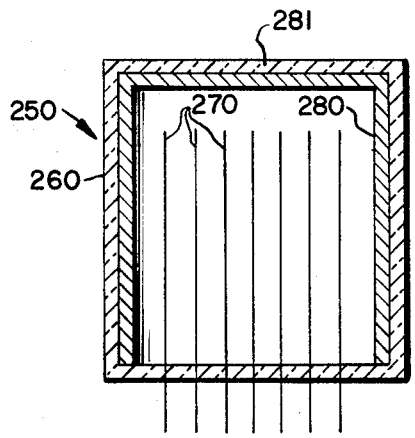
FIG. 11 is a sectional elevational view of another type of device which may utiilze the invention.
Figure 12:
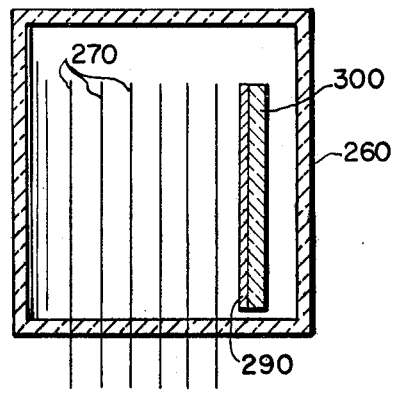
FIG. 12 is a sectional elevational view of a modification of the device shown in FIG. 11.

The principles of the invention may also be used in an electronic display device known as a Nixie tube 250 which is illustrated schematically in FIGS. 11 and 12 in only enough detail to illustrate the invention. A Nixie tube comprises a gas-filled envelope 260 in which is mounted a stack of cathode electrodes 270 in operative relation with an anode electrode, usually an encircling cylindrical metal plate and screen. In such a device using the principles of the invention, the anode electrode 280 is provided on the inner wall of all or a portion of the envelope (FIG. 11) as a porous metal film. The anode 280 might also be placed on the dome 281 of the envelope. This form of the anode might conveniently be of the type described above (FIG. 5) and including a layer of metal on a film of Mylar. As shown in FIG. 12, the anode 280 might comprise an apertured metal film 290 on a glass plate 300 positioned in front of the stack of cathodes, or several of such separate anodes might be positioned all around the stack of cathodes.

The invention has many advantages over the prior art. One of the most important advantages is that it provides, from an opaque body or film, an electrode which has strength but, at the same time, appears to be transparent. Another advantage is that, even though the metal electrode is made transparent, its thickness can be varied over a relatively wide range to provide the required strength and electrical characteristics. Another advantage lies in the fact that the transparent electrode may be fabricated relatively easily and in substantially any size and shape.

What is claimed is:
1. A display device comprising
  a support member,
  a light producing element carried by said support member, and
  a pair of electrodes positioned with said light producing member between them, at least one of said electrodes comprising a metal film having a large number of tiny perforation means therein for normally leaving said film substantially opaque in appearance and for effecting substantial translucency therein when said light producing element is activated.
2. The device defined in claim 1 wherein said light-producing element is an ionizable gas capable of producing light when electrically energized.
3. The device defined in claim 1 wherein said light-producing element comprises electroluminescent material which is capable of emitting light when electrically energized.
4. An electronic display device comprising
  a glass cell filled with an ionizable gas capable of glowing when an energizing potential is applied across it, and
  a pair of electrodes secured to said cell, at least one of said electrodes comprising a metal film having therein a large number of tiny aperture means for normally leaving said film substantially opaque in appearance and for effecting substantial translucency therein when an energizing potential is applied across said gas.
5. The device defined in claim 4 wherein said cell has the shape of a character to be displayed.
6. The device defined in claim 4 wherein said one electrode has the shape of a character to be displayed.
7. A display device comprising
  an envelope filled with an ionizable gas which can support cathode glow, an insulating support member,
a cathode electrode in the shape of a character on said insulating support member,
said cathode electrode comprising a metal strip secured to said insulating support and having a large number of tiny aperture means therein for normally leaving said metal strip substantially opaque in appearance and for effecting substantial transparency therein when said ionizable gas supports a cathode glow, and
an anode electrode mounted within said envelope in operative relation with said cathode electrode.

8. The device defined in claim 7 and including a plurality of said insulating support members, each carrying a cathode electrode and arrayed in a stack.

9. A display device comprising
a plurality of cells filled with an ionizable gas and arrayed in rows and columns in a panel having a top surface and a bottom surface,
a separate row electrode on said top surface in operative relation with each row of cells,
a separate column electrode on said bottom surface in operative relation with each column of cells,
said row electrodes comprising strips of metal having a large number of tiny aperture means therein for normally leaving said strips of metal substantially opaque in appearance and for effecting substantial translucency therein when said gas is ionized.

10. A display device comprising
an envelope filled with an ionizable gas which can sustain cathode glow,
a plurality of separate channels disposed within said envelope and adapted to be operated in different combinations to represent different characters,
each channel including at least one anode electrode and a cathode electrode,
said cathode electrode comprising a metal strip having a large number of tiny aperture means therein for normally leaving said metal strip substantially opaque in appearance and for effecting substantial translucency therein when said gas is sustaining a cathode glow.

11. The device defined in claim 10 wherein said envelope includes a glass cover plate covering said channels, said cathode electrodes being carried on said cover plate and positioned each adjacent to one channel.

12. A display device comprising
an envelope filled with an ionizable gas which can sustain cathode glow,
said envelope including a transparent viewing window,
a plurality of cathode electrodes disposed within said envelope and mounted in a stack facing said viewing window,
an anode electrode enclosing said stack of cathode electrodes and including a portion positioned between said cathode electrodes and said viewing window,
said portion of said anode electrode comprising a metal strip having a large number of tiny perforation means therein for normally leaving said metal strip substantially opaque in appearance and for effecting substantial translucency therein when said gas sustains a cathode glow.

References Cited
UNITED STATES PATENTS

| | | | |
|---|---|---|---|
| 2,848,638 | 8/1958 | Smith | 313—109.5 |
| 3,196,043 | 7/1965 | Harris et al. | 313—348 X |
| 3,260,882 | 7/1966 | Horseling | 313—109.5 |
| 3,334,269 | 8/1967 | L'Heureux | 313—89 X |
| 3,376,454 | 4/1968 | Stone | 313—109.5 |
| 2,774,004 | 12/1956 | Jaffe | 313—108 |

JAMES W. LAWRENCE, Primary Examiner

DAVID O'REILLY, Assistant Examiner

U.S. Cl. X.R.

313—108; 315—169